US012769103B2

(12) United States Patent
Sato et al.

(10) Patent No.: US 12,769,103 B2
(45) Date of Patent: Oct. 20, 2026

(54) OBSERVATION DEVICE

(71) Applicants: MDAP Co., Ltd, Chuo (JP); NIPRO CORPORATION, Settsu (JP)

(72) Inventors: Hidekazu Sato, Chuo (JP); Toshikazu Hayakawa, Chuo (JP); Yoshihiro Yoshikawa, Settsu (JP); Hideaki Yamamoto, Settsu (JP); Hisashi Miura, Settsu (JP)

(73) Assignees: MDAP CO., LTD., Yamanashi (JP); NIPRO CORPORATION, Osaka (JP)

( * ) Notice: Subject to any disclaimer, the term of this patent is extended or adjusted under 35 U.S.C. 154(b) by 229 days.

(21) Appl. No.: 18/722,992

(22) PCT Filed: Dec. 20, 2022

(86) PCT No.: PCT/JP2022/046783
§ 371 (c)(1),
(2) Date: Jun. 21, 2024

(87) PCT Pub. No.: WO2023/120500
PCT Pub. Date: Jun. 29, 2023

(65) Prior Publication Data

US 2025/0052988 A1 Feb. 13, 2025

(30) Foreign Application Priority Data

Dec. 22, 2021 (JP) ................................ 2021-208519

(51) Int. Cl.
*G02B 21/00* (2006.01)

(52) U.S. Cl.
CPC ..... *G02B 21/0056* (2013.01); *G02B 21/0032* (2013.01); *G02B 21/0048* (2013.01); *G02B 21/006* (2013.01); *G02B 21/008* (2013.01)

(58) Field of Classification Search
CPC ................ G02B 21/00; G02B 21/0004; G02B 21/0008; G02B 21/0012; G02B 21/0016;
(Continued)

(56) References Cited

U.S. PATENT DOCUMENTS 4,515,445 A * 5/1985 Muller ................ G02B 21/088
359/389
6,917,468 B2 * 7/2005 Thomas ............ G02B 21/0032
359/383
(Continued)

FOREIGN PATENT DOCUMENTS

JP 2012-242532 12/2012
JP 2015-219280 12/2015
(Continued)

OTHER PUBLICATIONS

Translation of the International Preliminary Report on Patentability issued Jul. 4, 2024 in International Application No. PCT/JP2022/046783.
(Continued)

*Primary Examiner* — Thong Q Nguyen
(74) *Attorney, Agent, or Firm* — Wenderoth, Lind & Poinack, L.L.P.

(57) ABSTRACT

An observation device configured to observe a sample stored in a multistage container including a plurality of spaces divided by a plurality of partition walls which are parallel. The observation device includes: a light source configured to generate light; a phase contrast microscope configured to irradiate the sample with light from the light source and to make executable observing a phase difference due to interference of light returned from the sample; and a reflection mirror configured to reflect light passed through the sample
(Continued)

again toward the sample. The reflection mirror is inclined with respect to the plurality of partition walls of the multi-stage container.

10 Claims, 10 Drawing Sheets

(58) Field of Classification Search

CPC .............. G02B 21/002; G02B 21/0024; G02B 21/0028; G02B 21/0032; G02B 21/0048; G02B 21/0052; G02B 21/0056; G02B 21/006; G02B 21/008; G02B 21/0084; G02B 21/06; G02B 21/14; G02B 21/24; G02B 21/26; G02B 21/361

USPC .................................................. 359/368–398

See application file for complete search history.

(56) References Cited

U.S. PATENT DOCUMENTS

| | | | | |
|---|---|---|---|---|
| 8,927,267 | B2 * | 1/2015 | Bennett .................. | C12M 23/24<br>435/297.5 |
| 10,208,279 | B2 * | 2/2019 | Vom ........................ | C12M 41/46 |
| 2012/0293644 | A1 | 11/2012 | Fukutake et al. | |
| 2017/0075097 | A1 | 3/2017 | Dowaki et al. | |
| 2020/0002661 | A1 | 1/2020 | Kesyou et al. | |
| 2022/0290084 | A1 | 9/2022 | Yoshikawa et al. | |

FOREIGN PATENT DOCUMENTS

| | | |
|---|---|---|
| JP | 2020-000193 | 1/2020 |
| JP | 2020-005553 | 1/2020 |
| WO | 2013/176549 | 11/2013 |
| WO | 2021/006278 | 1/2021 |

OTHER PUBLICATIONS

International Search Report issued Mar. 20, 2023 in International Application No. PCT/JP2022/046783, with English translation.

* cited by examiner

Fig. 3
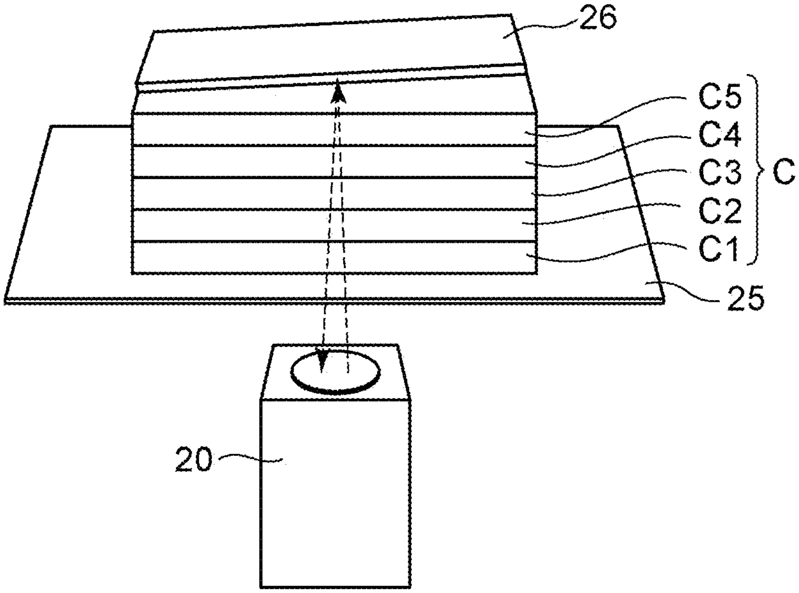
Fig. 4A
Fig. 4B
Fig. 4C
Fig. 4D
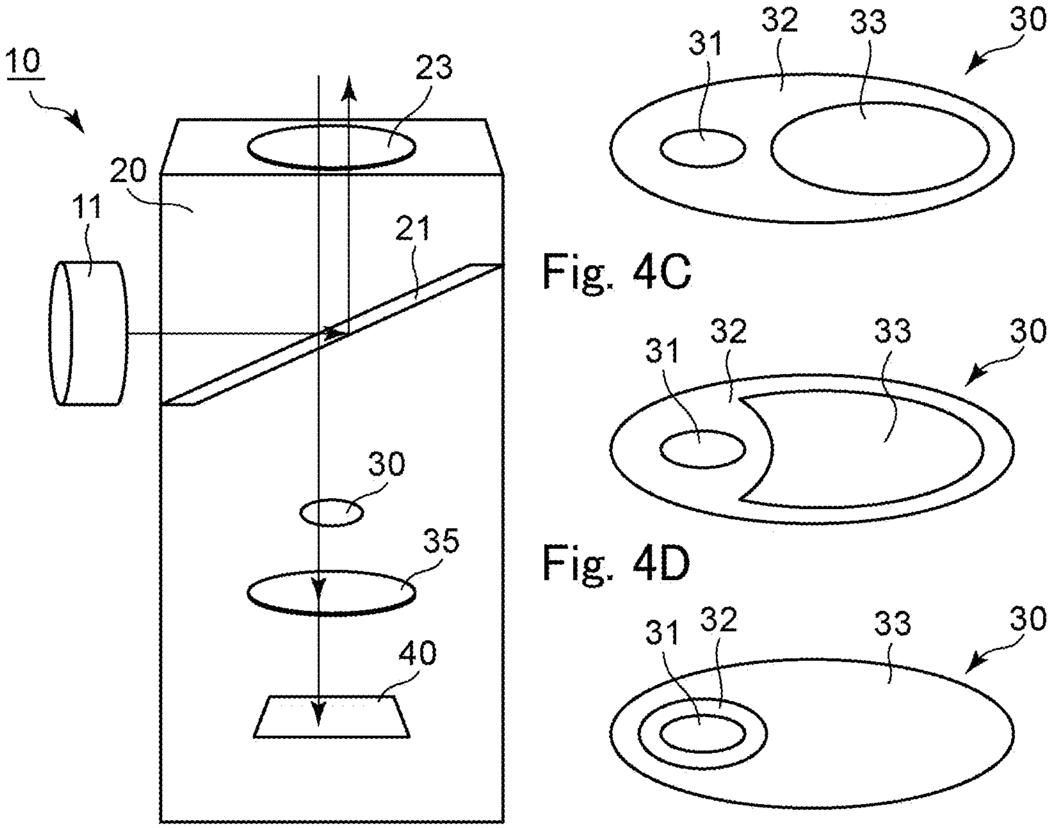

OBSERVATION DEVICE

TECHNICAL FIELD

The present invention relates to an observation device including a phase contrast microscope. As an example, the present invention relates to an observation device for observing a sample, for example, a cell, stored in a multi-stage cell culture container.

BACKGROUND ART

Cells necessary for treatment of diseases and production and evaluation of pharmaceuticals are cultured. The cell culture is generally performed in an incubator in which temperature, humidity, and the like are kept constant. Patent Document 1 discloses using a multistage cell culture container for mass producing cells.

PRIOR ART DOCUMENT

Patent Document

Patent Document 1: JP 2020-193 A

SUMMARY OF THE INVENTION

Problems to be Solved by the Invention

The incubator is provided with an observation device for visually confirming a state of the cells being cultured. Cell culture containers are generally made of a transparent material, such as glass, synthetic resin, or the like. In a case where the cell culture container is a multistage container, the observation device is generally installed above or below the cell culture container.

In a case where only a sample stored in a specific space, for example, a space located at the lowermost stage of the multistage container is observed using an observation device, stray light reflected, refracted, or scattered from another stage of the culture container may enter the observation device. Such stray light is superimposed as noise on a sample image to be observed, and a clear sample image may not be obtained.

Furthermore, a considerable amount of culture medium is stored in each space of the multistage container. Therefore, due to the weight of the culture medium, a partition wall dividing the space may be bent and distorted, and a refraction direction of light may change. As a result, stray light reflected, refracted, or scattered from a stage other than an observation target may enter the observation device.

An object of the present invention is to provide an observation device capable of reducing stray light superimposed as noise on a sample image to be observed by optimizing an observation direction, so that a clear sample image is obtained.

Solutions to the Problems

One aspect of the present invention is an observation device configured to observe a sample stored in a multistage container including a plurality of spaces divided by a plurality of partition walls which are parallel, the observation device including:

a light source configured to generate light;

a phase contrast microscope configured to irradiate the sample with light from the light source and to make executable observing a phase difference due to interference of light returned from the sample; and a reflection mirror configured to reflect light passed through the sample again toward the sample, wherein the reflection mirror is inclined with respect to a partition wall of the multistage container.

According to this configuration, the reflection mirror configured to reflect the light passed through the sample again toward the sample is inclined with respect to the partition wall of the multistage container. Therefore, a traveling direction of stray light reflected, refracted, or scattered from the container not to be observed can be shifted with respect to a traveling direction of the light returning from the sample stored in a container space to be observed. As a result, the stray light superimposed as noise on a sample image of the observation target can be reduced.

According to an aspect of the present invention, the phase contrast microscope may include a phase plate unit including a phase plate region that changes a phase of light, a transparent plate region that does not change a phase of light, and a light shielding plate region that blocks light.

According to this configuration, light returning from the container to be observed passes through the phase plate region and the transparent plate region, while stray light reflected, refracted, and scattered from the container not to be observed can be blocked by the light shielding plate region.

An aspect of the present invention may further include a swing mechanism configured to angularly displace the phase contrast microscope around a first axis and a second axis, the first axis and the second axis being perpendicular to a light traveling direction and orthogonal to each other.

According to this configuration, an observation direction of the phase contrast microscope can be adjusted so as to match a traveling direction of the light reflected by the reflection mirror.

An aspect of the present invention may further include a two-dimensional movement mechanism configured to move the phase contrast microscope along a direction parallel to the first axis and a direction parallel to the second axis.

According to this configuration, an observation region of the phase contrast microscope can be two-dimensionally changed.

An aspect of the present invention may further include a sample stage configured to support a sample, wherein the two-dimensional movement mechanism is installed below the sample stage, and the phase contrast microscope is suspended downward from the two-dimensional movement mechanism.

According to this configuration, a relative positional accuracy between the sample stage and the phase contrast microscope is higher than a configuration in which the two-dimensional movement mechanism is installed on a bottom surface of a housing of a device and the phase contrast microscope is mounted thereon.

An aspect of the present invention may further include:

an imaging camera configured to acquire a sample image based on observing the phase difference using the phase contrast microscope;

an image processing circuit configured to repeat swing scanning and imaging of the phase contrast microscope for each predetermined step angle around the first axis and the second axis, and configured to store a plurality of sample images which are obtained; and a display unit configured to display the plurality of sample images stored in the image processing circuit on an identical screen.

According to this configuration, M times of scanning and imaging are performed around the first axis, and N times of scanning and imaging are performed around the second axis, so that M×N sample images with slightly different observation directions are obtained. By displaying the obtained M×N sample images on the identical screen, it is possible to quickly specify a sample image with the least noise due to stray light.

An aspect of the present invention may further include a focusing mechanism configured to adjust a position of the imaging camera along a light traveling direction.

According to this configuration, a clear image can be quickly acquired.

According to an aspect of the present invention, the multistage container may be installed inside an incubator.

According to this configuration, the sample being cultured in the incubator can be observed as it is.

Effects of the Invention

According to the present invention, it is possible to realize an observation device capable of reducing stray light superimposed as noise on a sample image to be observed, so that a clear sample image is obtained.

BRIEF DESCRIPTION OF THE DRAWINGS

FIG. 3 is a perspective view illustrating an example of a use state of the observation device according to the present invention.

FIG. 4A is a perspective view illustrating an example of a configuration of the observation device according to the present invention. FIGS. 4B to 4D are perspective views illustrating various examples of a phase plate unit.

DETAILED DESCRIPTION

Figure 1:
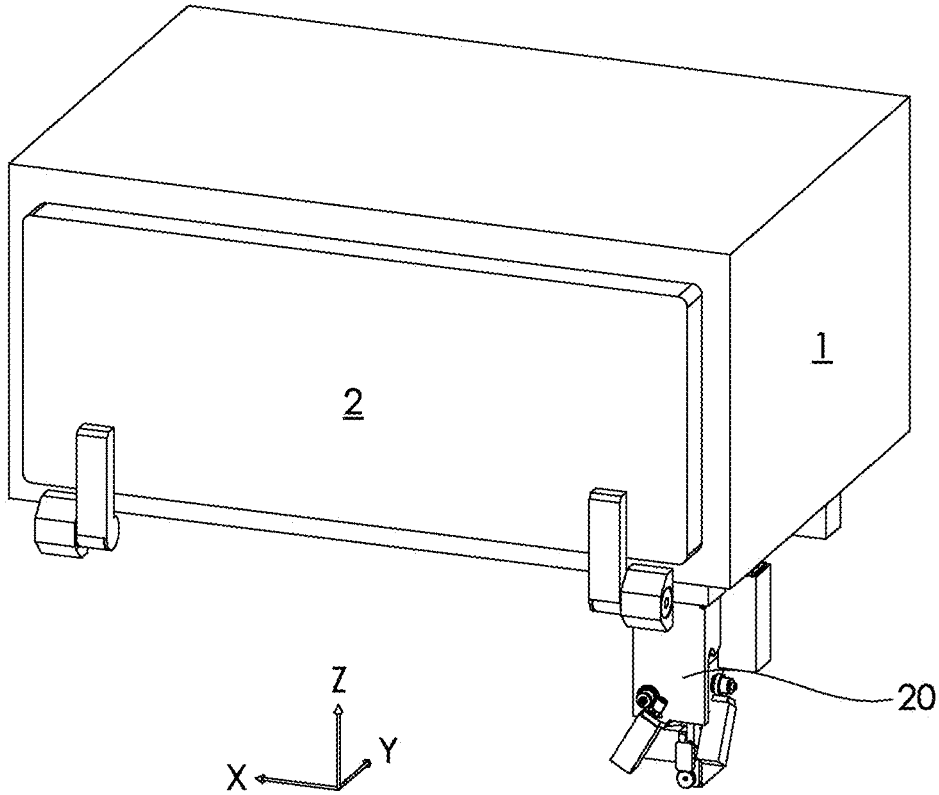
FIG. 1 is a perspective view illustrating an appearance of an incubator on which an observation device according to the present invention is mounted.
Figure 2:
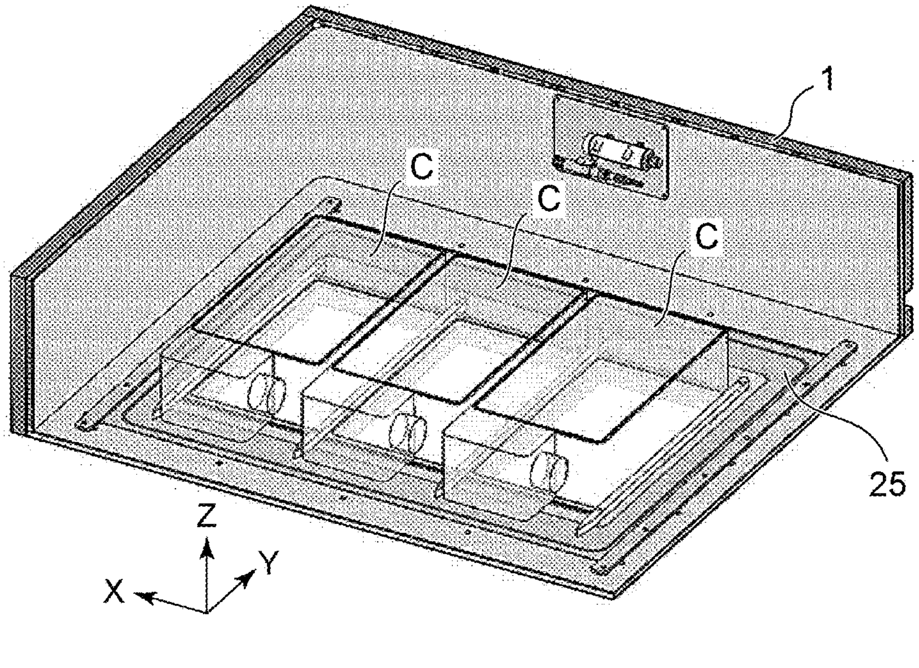
FIG. 2 is a perspective view illustrating a multistage container stored in an internal space of the incubator.

FIG. 1 is a perspective view illustrating an appearance of an incubator on which an observation device according to the present invention is mounted. FIG. 2 is a perspective view illustrating a multistage container stored in an internal space of the incubator.

An incubator 1 includes a housing having a substantially rectangular parallelepiped shape, and a hatch 2 configured to be openable and closable to access an internal space of the incubator 1. The incubator 1 includes a mechanism for controlling the temperature and humidity of the internal space, and includes, for example, a heater, a cooler, a humidifier, a temperature sensor, a humidity sensor, an operation panel, a microprocessor, and the like.

As illustrated in FIG. 2, the incubator 1 includes a sample stage 25 provided in a bottom plate of the incubator to place a plurality of (for example, three) multistage containers C side by side horizontally. Each of the multistage containers C includes a plurality of spaces divided by a plurality of partition walls which are parallel, and includes, for example, a structure such that a plurality of (for example, five) substantially rectangular parallelepiped hollow containers are integrally stacked. Each of the multistage containers C is generally made of a transparent material such as glass or synthetic resin to be easily viewed from an outside. The sample stage 25 includes a transparent window to face a lower wall of the multistage container C. When such a multistage container C is placed on the sample stage 25, each of partition walls of the multistage container C and a surface of the sample stage 25 are parallel to each other.

Returning to FIG. 1, a two-dimensional movement mechanism is installed below the sample stage 25 of the incubator 1. A phase contrast microscope 20 is installed to be suspended downward from the two-dimensional movement mechanism. The phase contrast microscope 20 includes a swing mechanism configured to cause angular displacement around an X-axis and a Y-axis, the X-axis and the Y-axis being perpendicular to a light traveling direction (Z direction) and orthogonal to each other.

In FIG. 1, for easy understanding, the phase contrast microscopes 20 positioned at coordinates (X1, Y1), (X2, Y1), (X1, Y2), and (X2, Y2) corresponding to an upper limit and a lower limit of XY movement are illustrated, however one phase contrast microscope 20 is actually used. These two-dimensional movement mechanism and swing mechanism will be described in detail later.

FIG. 3 is a perspective view illustrating an example of a use state of the observation device according to the present invention. A multistage container C in which rectangular parallelepiped containers C1 to C5 are integrally stacked is placed on the sample stage 25. The phase contrast microscope 20 is positioned below the sample stage 25. A reflection mirror 26 is provided above the multistage container C. The reflection mirror 26 is a flat plate-shaped optical element including a surface having a high light reflectance, and has a function of reflecting light passed through the multistage container C toward the multistage container C again, whereby an amount of light incident on the phase contrast microscope 20 can be increased.

In the observation device according to the present invention, the reflection mirror 26 is not parallel with respect to a partition wall of the multistage container C, and is preferably inclined in a range of 1.87° to 2.17° with respect to the partition wall of the multistage container C. Note that an inclination angle of the reflection mirror can be appropriately selected according to a type of lens to be used, and the inclination of the reflection mirror does not specify positive or negative. This makes it possible to suppress influence of stray light. Details will be described later.

FIG. 4A is a perspective view illustrating an example of a configuration of the observation device 10 according to the present invention. The observation device 10 includes a light source 11 configured to generate light, the phase contrast microscope 20, the reflection mirror 26 illustrated in FIG. 3, and the like. The phase contrast microscope 20 is an optical device configured to irradiate the multistage container C with light from the light source 11 and to make executable observing a phase difference due to interference of light returned from the multistage container C, and includes, as an example, a half mirror 21, an objective lens 23, a phase plate unit 30, a lens 35, an imaging camera 40, and the like. The objective lens 23 may include a plurality of lenses. The lens 35 may be omitted as necessary. Details of the observation device 10 will be described later.

FIGS. 4B to 4D are perspective views illustrating various examples of the phase plate unit 30. The phase plate unit 30 includes a surface of a transparent substrate on which a birefringence layer, a light absorption layer, a light reflection layer, and the like are formed, and includes a phase plate region 31 that changes a phase of light, a transparent plate region 32 that does not change a phase of light, and a light shielding plate region 33 that blocks light.

In the phase plate unit 30 illustrated in FIG. 4B, the phase plate region 31 is provided as a circular region centered at a position shifted to the left by about R/2 from a center of a disk having a radius R. The light shielding plate region 33 is provided as a circular region centered at a position shifted to the right by about R/2 from the center of the disk having the radius R. A region excluding the phase plate region 31 and the light shielding plate region 33 becomes the transparent plate region 32.

In the phase plate unit 30 illustrated in FIG. 4C, the phase plate region 31 is provided as a circular region centered at a position shifted to the left by about R/2 from a center of a disk having a radius R. The light shielding plate region 33 is provided as a crescent region centered at a position shifted to the right by about R/2 from the center of the disk having the radius R. A region excluding the phase plate region 31 and the light shielding plate region 33 becomes the transparent plate region 32.

In the phase plate unit 30 illustrated in FIG. 4D, the phase plate region 31 is provided as a circular region centered at a position shifted to the left by about R/2 from a center of a disk having a radius R. The transparent plate region 32 is located outside the phase plate region 31 and provided as a ring-shaped region concentric with the phase plate region 31. An area of the transparent plate region 32 is substantially the same as an area of the phase plate region 31. A region excluding the phase plate region 31 and the transparent plate region 32 becomes the light shielding plate region 33.

Figure 5:
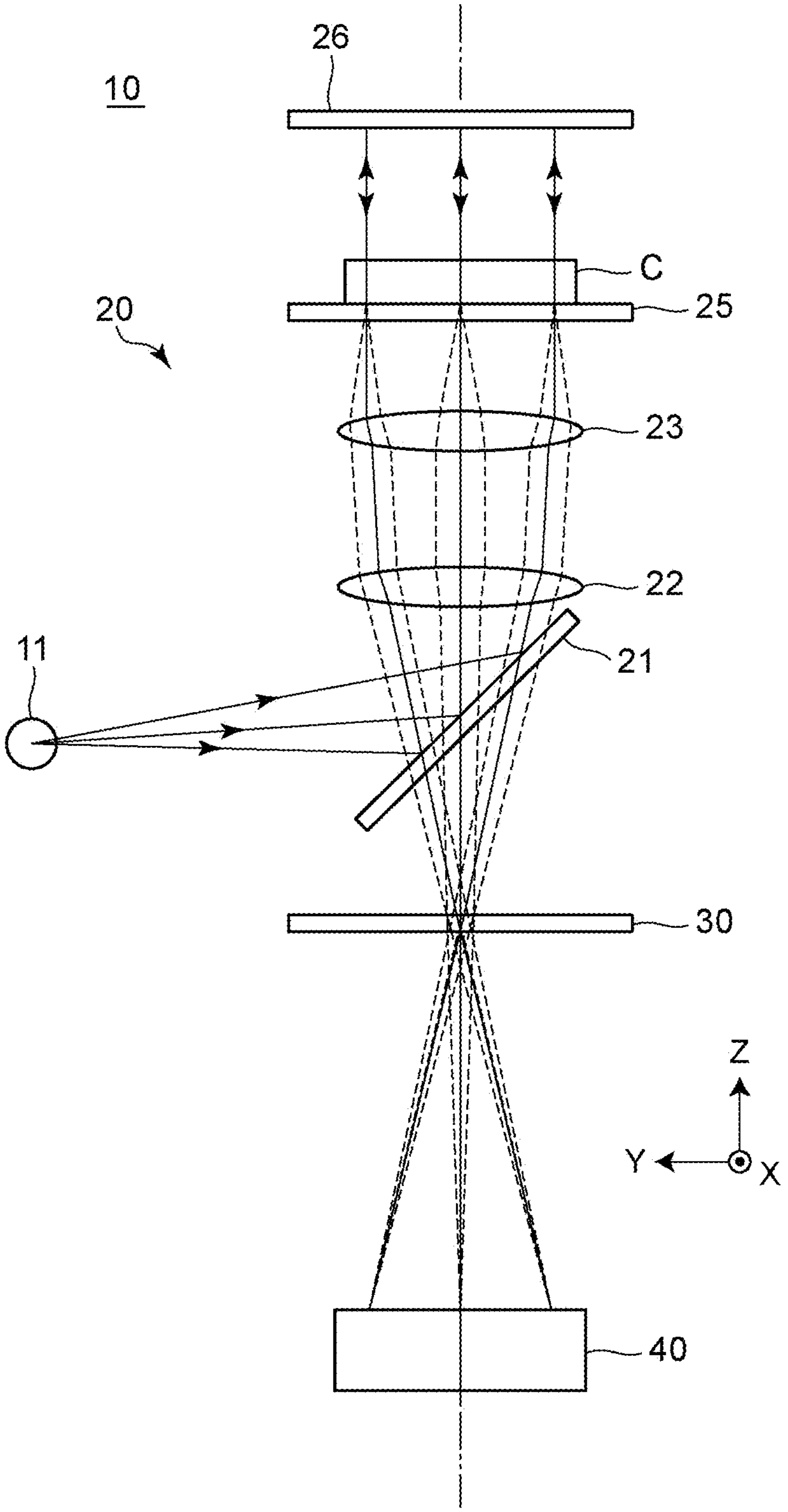
FIG. 5 is a configuration diagram illustrating an example of an optical system of the observation device according to the present invention.

FIG. 5 is a configuration diagram illustrating an example of an optical system of the observation device 10 according to the present invention. The observation device 10 includes the light source 11, the phase contrast microscope 20, the reflection mirror 26, and the like.

The light source 11 includes, for example, a light emitting diode (LED), a fluorescent lamp, a discharge lamp, an incandescent lamp, and the like, and may include a condenser lens, a collimating lens, a wavelength filter, an aperture, and the like as necessary.

The phase contrast microscope 20 includes the half mirror 21, objective lenses 22 and 23, the phase plate unit 30, the imaging camera 40, and the like. The sample stage 25 and the multistage container C mounted on the sample stage 25 are interposed between the objective lens 23 and the reflection mirror 26.

The half mirror 21 has a function of partially reflecting and partially transmitting incident light. The half mirror 21 is configured to reflect illumination light from the light source 11 and to transmit light returning from the multistage container C and the reflection mirror 26 here.

The objective lenses 22 and 23 are configured to focus illumination light toward the multistage container C and to focus light from the sample stored in the multistage container C to image an image on an imaging surface of the imaging camera 40.

As described above, the phase plate unit 30 includes the phase plate region 31, the transparent plate region 32, and the light shielding plate region 33. When light from the sample enters the transparent plate region 32, the light passes as it is without changing the phase of the light. When light from the sample enters the phase plate region 31, the phase of the light is delayed by a predetermined phase difference, for example, λ (wavelength)/4, as compared with light passed through the transparent plate region 32. When light from the sample enters the light shielding plate region 33, the light is blocked.

The imaging camera 40 includes, for example, a CMOS, a CCD, or the like, includes a plurality of photoelectric conversion elements arranged two-dimensionally, and may include a microlens, a wavelength filter, an aperture, or the like as necessary. An image imaged on the imaging surface of the imaging camera 40 is converted into an electric signal.

Next, observing a phase difference due to interference of light will be described. Illumination light from the light source 11 is reflected upward by the half mirror 21, passes through the objective lenses 22 and 23, the sample stage 25, and the multistage container C, is reflected downward by the reflection mirror 26, and irradiates the sample stored in the multistage container C. When the light passes through the sample, the light is divided into light traveling straight (straight light) and light diffracted by the sample (diffracted light). A phase of the diffracted light is delayed by λ/4 as compared with the straight light. In FIG. 5, the straight light passed through the sample is indicated by a solid line, and the diffracted light diffracted by the sample is indicated by a broken line.

The light passed through the sample is further imaged on the imaging surface of the imaging camera 40 by the objective lenses 22 and 23. On the imaging surface, light passed through the phase plate region 31 of the phase plate unit 30 and light passed through the transparent plate region 32 interfere with each other. In constructive interference that strengthens phase, intensity of light increases, while in destructive interference that weakens phase, intensity of light decreases. In this way, an image in which brightness changes according to phase distribution of the sample is obtained.

Figure 6:
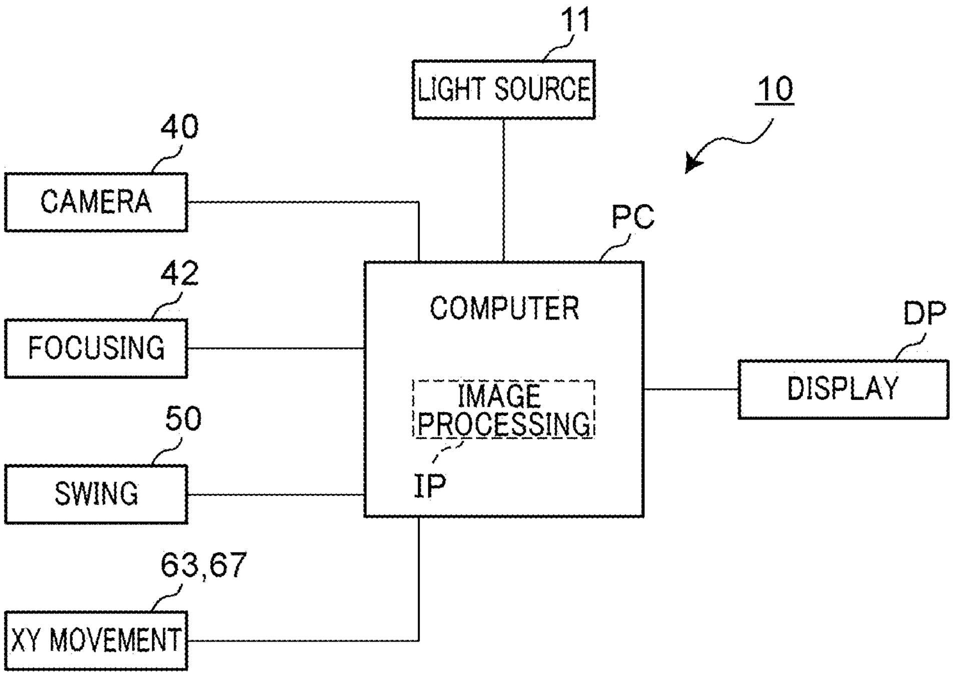
FIG. 6 is a block diagram illustrating an example of an electrical configuration of the observation device according to the present invention.

FIG. 6 is a block diagram illustrating an example of an electrical configuration of the observation device 10 according to the present invention. The observation device 10 includes the light source 11, the imaging camera 40, a focusing mechanism 42, a swing mechanism 50, XY movement mechanisms 63 and 67, a computer PC, a display DP, and the like.

The focusing mechanism 42 has a function of adjusting a position of the imaging camera 40 along a light traveling direction (Z direction).

The swing mechanism 50 has a function of angularly displacing the phase contrast microscope 20 around the X axis and the Y axis, the X axis and the Y axis being perpendicular to the light traveling direction (Z direction) and orthogonal to each other.

The XY movement mechanisms 63 and 67 have a function of moving the phase contrast microscope 20 along a direction parallel to the X axis and the Y axis.

The computer PC includes an A/D converter, a D/A converter, a central processing unit (CPU), a graphics processing unit (GPU), a ROM, a RAM, an EEPROM, a mass storage, an external I/F, and the like, and is configured to manage an operation of each unit and the entire operation of the observation device 10 according to a predetermined program. An image processing circuit IP specialized in image processing may be installed in the computer PC.

The display DP includes, for example, an LCD or the like, and is configured to display data from the computer PC to a user. In addition, a mouse, a keyboard, a touch panel, and the like for data input can be connected to the computer PC.

Figure 7A:
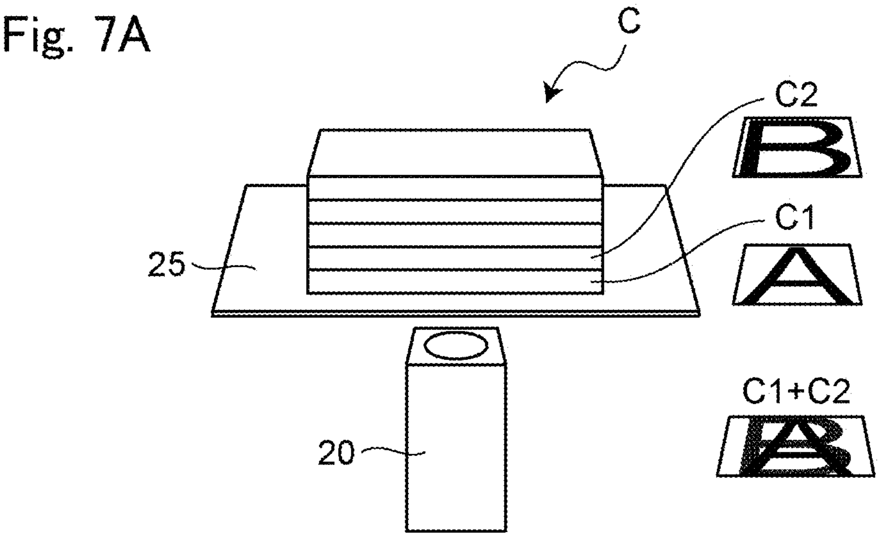
FIGS. 7A to 7C are explanatory diagrams illustrating functions of a reflection mirror according to the present invention.
Figure 7B:
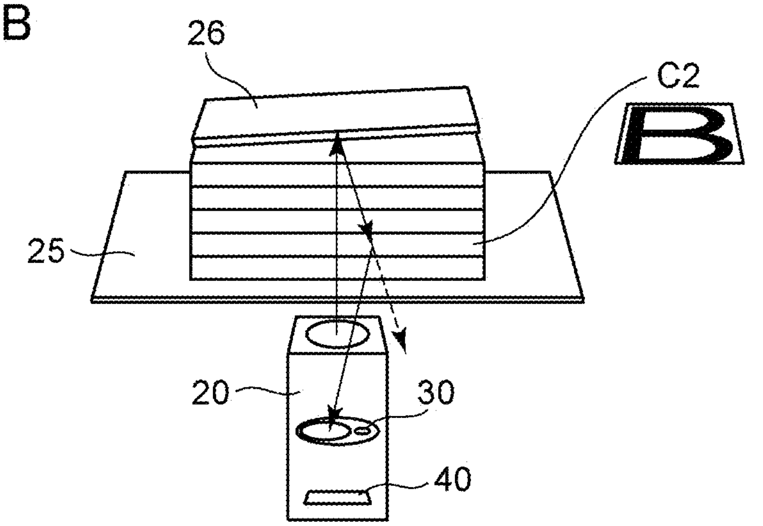
Figure 7C:
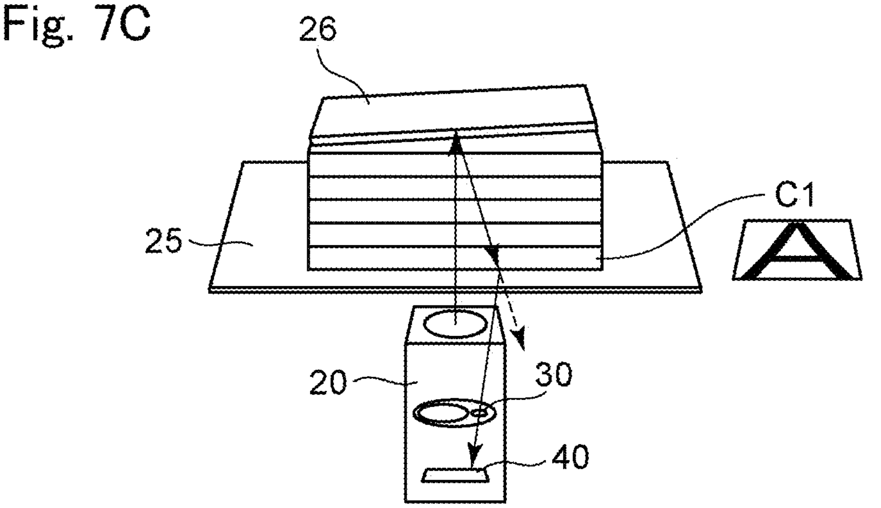

FIGS. 7A to 7C are explanatory diagrams illustrating functions of the reflection mirror 26 according to the present invention. In FIG. 7A, the reflection mirror 26 is not present. A multistage container C in which containers C1 to C5 are stacked is placed on the sample stage 25. As an example, cells are accommodated inside each of the containers C1 to C5 together with a culture medium. In this case, the phase contrast microscope 20 observes a sample image A stored in the lowermost container C1 and a sample image B stored in the second container C2 from the bottom in an overlapping state. For example, in a case where the sample image A of the lowermost container C1 is an observation target, the sample image B of the container C2 is mixed as noise. Furthermore, the same applies to the opposite. Note that sample images of the containers C3 to C5 are also observed as noise, but are not illustrated for easy understanding.

Next, in FIGS. 7B and 7C, the reflection mirror 26 is slightly inclined with respect to the partition wall of the multistage container C. The inclined reflection mirror 26 obliquely reflects illumination light from the phase contrast microscope 20 to the outside of an axis. At this time, by finely adjusting an inclination angle of the reflection mirror 26, setting can be performed such that stray light reflected, refracted, and scattered from the container C2 is incident on the light shielding plate region 33 of the phase plate unit 30 (FIG. 7B), and observation light reflected, refracted, and scattered from the container C1 is incident on the phase plate region 31 and the transparent plate region 32 of the phase plate unit 30 (FIG. 7C). As a result, intensity of a sample image B of the container C2 decreases, and a clear sample image A can be obtained.

Figure 8A:
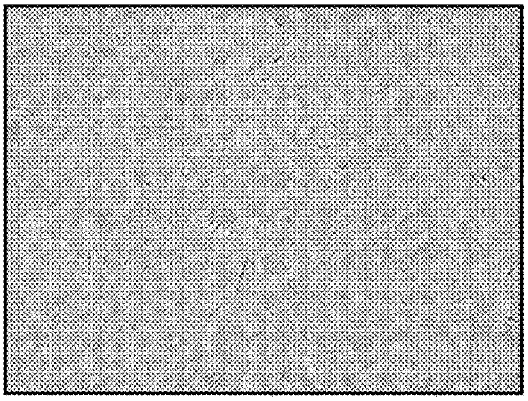
FIG. 8A illustrates an example of a sample image captured with a setting illustrated in FIG. 7A.
Figure 8B:
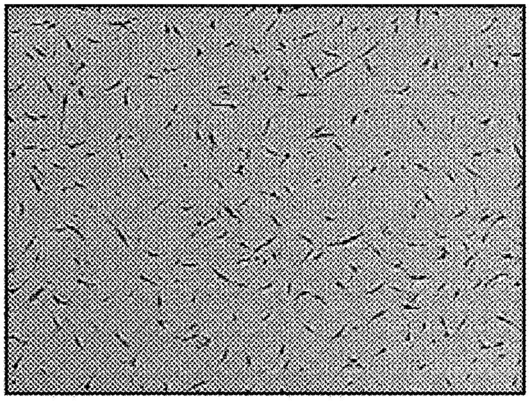
FIG. 8B illustrates an example of a sample image captured with settings illustrated in FIGS. 7B and 7C.

FIG. 8A illustrates an example of a sample image captured with the setting illustrated in FIG. 7A. FIG. 8B illustrates an example of a sample image captured with the settings illustrated in FIGS. 7B and 7C. Referring to FIG. 8A, a clear image of cells stored in the container C1 is observed, however an image of cells in a defocus state is observed in an overlapping state in the background. On the other hand, referring to FIG. 8B, an image of cells in the defocused state is considerably erased, and only a clear image of cells stored in the container C1 is observed.

Figure 9A:
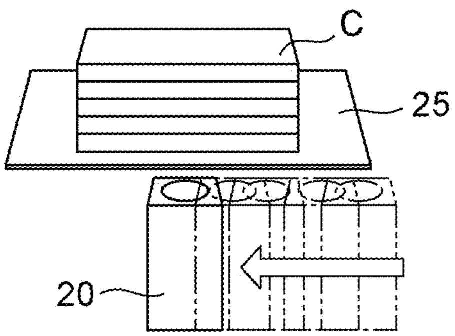
FIG. 9 is an explanatory diagram illustrating an operation of a swing mechanism according to the present invention.

FIGS. 9A to 9D are explanatory diagrams illustrating an operation of the swing mechanism according to the present invention. In FIG. 9A, the phase contrast microscope 20 is positioned at a desired position by the XY movement mechanisms 63 and 67. At this time, the phase contrast microscope 20 faces the multistage container C, and has an angle θx=0° around the X axis and an angle θy=0° around the Y axis.

Figure 9B:
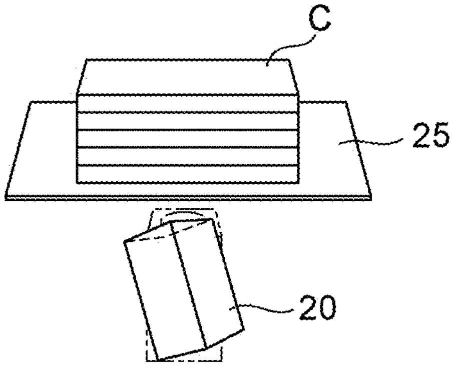
Figure 9C:
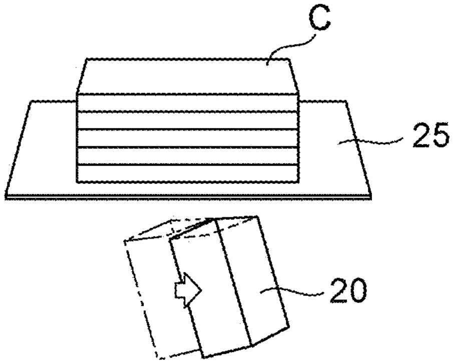

Next, in FIG. 9B, the phase contrast microscope 20 is angularly displaced by a predetermined angle around the X axis, for example, θx=−1.2° and θy=−1.2°. This angular displacement shifts an observation position in the multistage container C. Therefore, in FIG. 9C, the phase contrast microscope 20 is moved along the Y direction to return the observation position to the state of FIG. 9A.

Figure 9D:
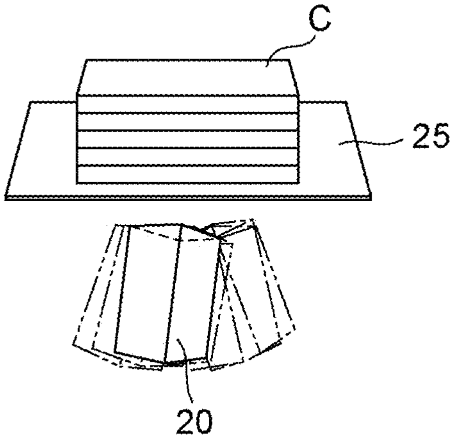

Next, in FIG. 9D, the phase contrast microscope 20 repeats swing scanning and imaging at a predetermined step angle in a range of θx=−1.2° to +1.2°, for example, every Δθx=0.3°. A center of the swing scanning is the observation position determined in FIG. 9A. By this swing scanning, a total of nine sample images corresponding to swing angles of (θx, θy)=(−1.2°, −1.2°), (−0.9°, −1.2°), (−0.6°, −1.2°), (−0.3°, −1.2°, (0°, −1.2°, (0.3°, −1.2°, (0.6°, −1.2°, (0.9°, −1.2°, and (1.2°, −1.2° are obtained and stored in the image processing circuit IP illustrated in FIG. 6.

Next, the phase contrast microscope 20 is angularly displaced by θy=0.3° around the Y axis. Then, by repeating swing scanning and imaging similar to those described above, a total of nine sample images corresponding to head swing angles of (θx, θy)=(−1.2°, −0.9°), (−0.9°, −0.9°), (−0.6°, −0.9°), (−0.3°, −0.9°, (0°, −0.9°), (0.3°, −0.9°, (0.6°, −0.9°, (0.9°, −0.9°), and (1.2°, −0.9° are obtained. This swing scanning is similarly repeated in a range of θy=−1.2° to 1.2°.

By scanning at a step angle of 0.3° in a range of (θx, θy)=(−1.2°, −1.2°) to (1.2°, 1.2°), a total of 81 sample images are obtained and stored in the image processing circuit IP. The plurality of sample images stored in this way are displayed on the same screen on the display DP illustrated in FIG. 6.

Figure 10:
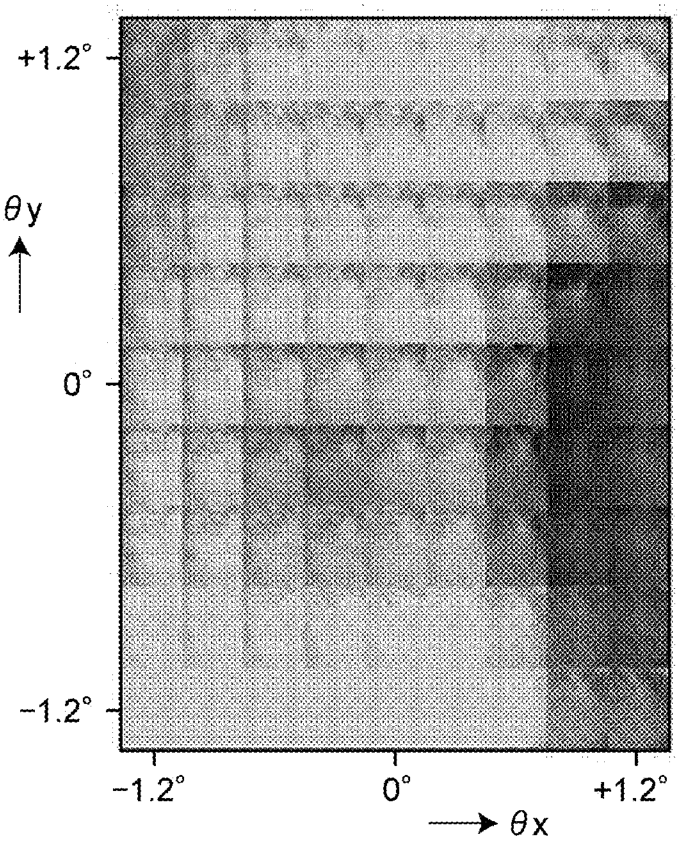
FIG. 10 illustrates an entire sample image in which 81 sample images are arranged in order.

FIG. 10 illustrates an entire sample image in which 81 sample images are arranged in order. Referring to FIG. 10, (θx, θy)=(0°, 0°) corresponds to a directly facing posture of FIG. 9A. The sample image of (−0.3°, −0.3°) has less noise than this and can be quickly identified as a clearer image.

In the above description, the case has been exemplified where swing scanning is performed for each step angle of 0.3° in the scanning range of −1.2° to +1.2° around the X axis and the Y axis to acquire a total of 81 sample images, however the scanning range may be larger or smaller than this range, the step angle may be larger or smaller than 0.3°, and the total number of sample images may be larger or smaller than 81.

Figure 11A:
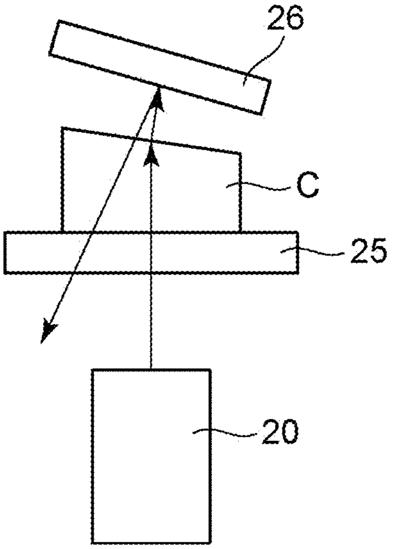
FIG. 11 is an explanatory diagram illustrating a principle of a swing motion.

FIG. 11 is an explanatory diagram illustrating the principle of the swing motion. FIG. 12 is an explanatory diagram illustrating a light path in the phase contrast microscope 20. In FIG. 11A, the phase contrast microscope 20 faces the multistage container C in a state where the reflection mirror 26 is inclined. Therefore, illumination light reflected by the reflection mirror 26 does not enter the phase contrast microscope 20.

Figure 11B:
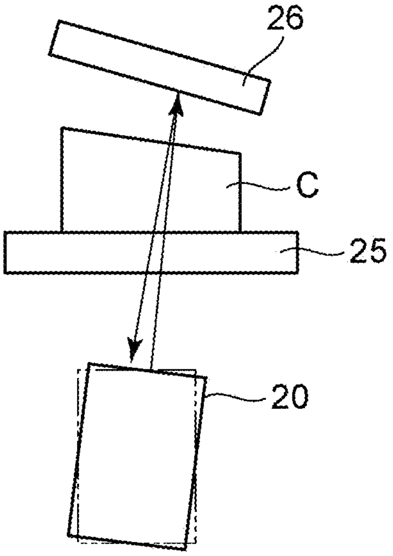
Figure 12:
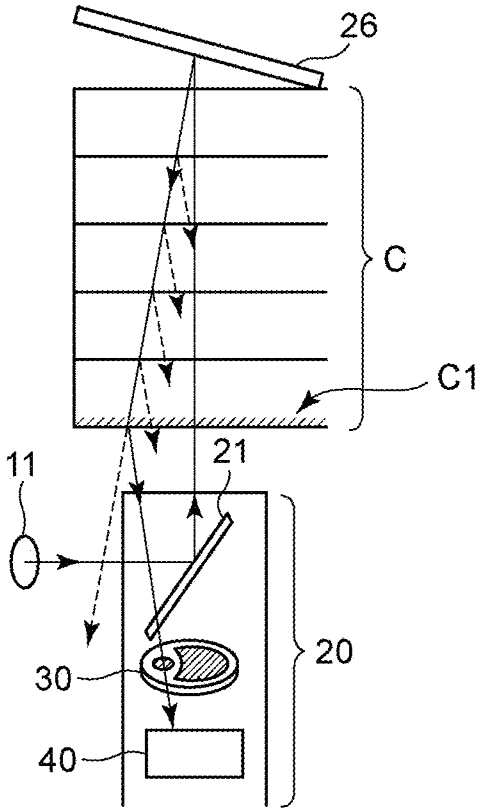
FIG. 12 is an explanatory diagram illustrating a light path in a phase contrast microscope.

Next, in FIG. 11B, the phase contrast microscope 20 is inclined by swing motion in a state where the reflection mirror 26 is inclined. Therefore, illumination light reflected by the reflection mirror 26 enters the phase contrast microscope 20.

As illustrated in FIG. 12, illumination light reflected by the reflection mirror 26 passes through the multistage container C, and observation light from the sample stored in the container C1 passes through the phase plate region 31 and the transparent plate region 32 of the phase plate unit 30. On the other hand, light from the samples stored in the containers C2 to C5 other than the container C1 cannot pass through the phase plate region 31 and the transparent plate region 32. Therefore, sample image components of the containers C2 to C5 can be removed, and only the sample image of the container C1 can be limited to the observation target.

Figure 13A:
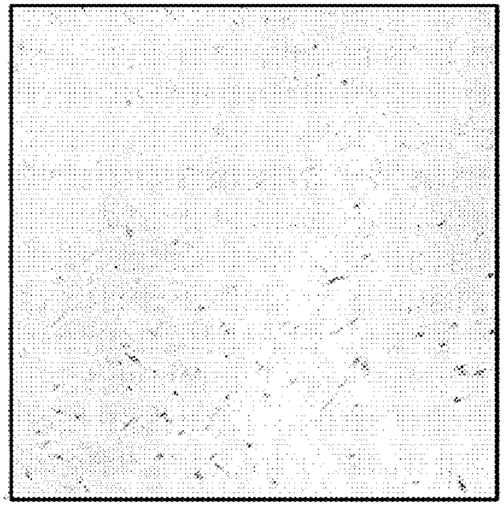
FIG. 13A illustrates an example of an unclear sample image.
Figure 13B:
FIG. 13B illustrates an example of a clear sample image.

FIG. 13A illustrates an example of an unclear sample image. FIG. 13B illustrates a sample image corresponding to the same observation position as that in FIG. 13A. The unclear image illustrated in FIG. 13A is generated in an arrangement illustrated in FIG. 11A. Furthermore, even in a case where distortion occurs in the multistage container C, the image becomes unclear. FIG. 13B is a clear image with appropriate contrast, and is obtained by an arrangement as illustrated in FIG. 11B.

Figure 14:
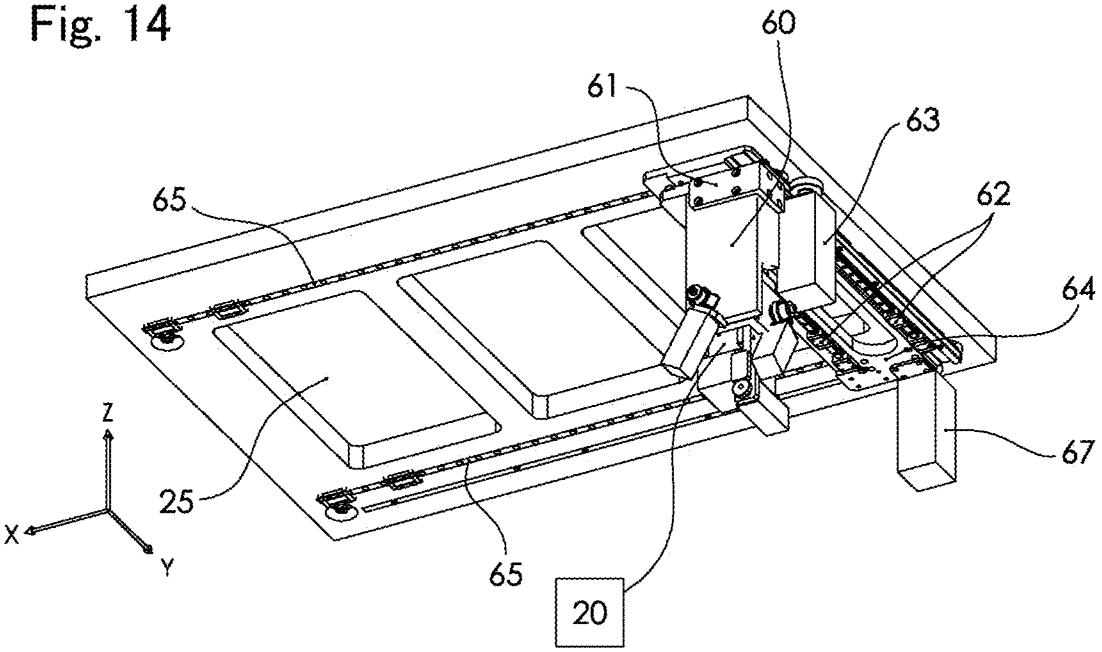
FIG. 14 is a perspective view of the incubator illustrated in FIG. 1 as viewed obliquely from below.

FIG. 14 is a perspective view of the incubator 1 illustrated in FIG. 1 as viewed obliquely from below, and illustrates a two-dimensional movement mechanism of the observation device 10. The two-dimensional movement mechanism includes a Y movement unit configured to control movement in the Y direction and an X movement unit configured to control movement in the X direction.

The Y movement unit includes a Y table 61 configured to move in the Y direction, two linear guides 62 configured to guide linear movement of the Y table 61, and a Y movement mechanism 63 configured to drive linear movement of the Y table 61. The X movement unit includes an X table 64 configured to move in the X direction, two linear guides 65 configured to guide linear movement of the X table 64, and an X movement mechanism 67 configured to drives linear movement of the X table 64.

The Y movement unit is fixed to the X table 64. The phase contrast microscope 20 is held by a holder 60 fixed to the Y table 61. The Y movement mechanism 63 and the X movement mechanism 67 can include, for example, a linear motor, a rotary motor, a rack and pinion, a toothed belt, a wire, a pulley, and the like. Furthermore, a rotary encoder, a linear encoder, a pulse motor, or the like can be used to monitor the Y-direction position and the X-direction position.

In the present embodiment, such a two-dimensional movement mechanism is installed below the sample stage 25, and the phase contrast microscope 20 is suspended downward from the two-dimensional movement mechanism. Such a suspension mechanism increases relative positional accuracy between the sample stage 25 and the phase contrast microscope 20 as compared with a configuration in which the two-dimensional movement mechanism is installed on the bottom surface of the housing of the device and the phase contrast microscope is mounted thereon. Therefore, the observation position of the sample can be set with high accuracy.

Figure 15A:
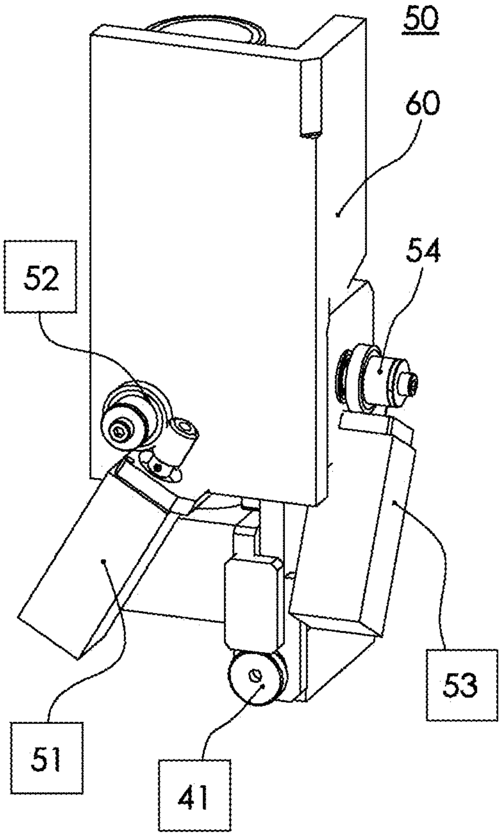
FIG. 15A is a perspective view illustrating the swing mechanism 50 of the observation device 10.
Figure 15B:
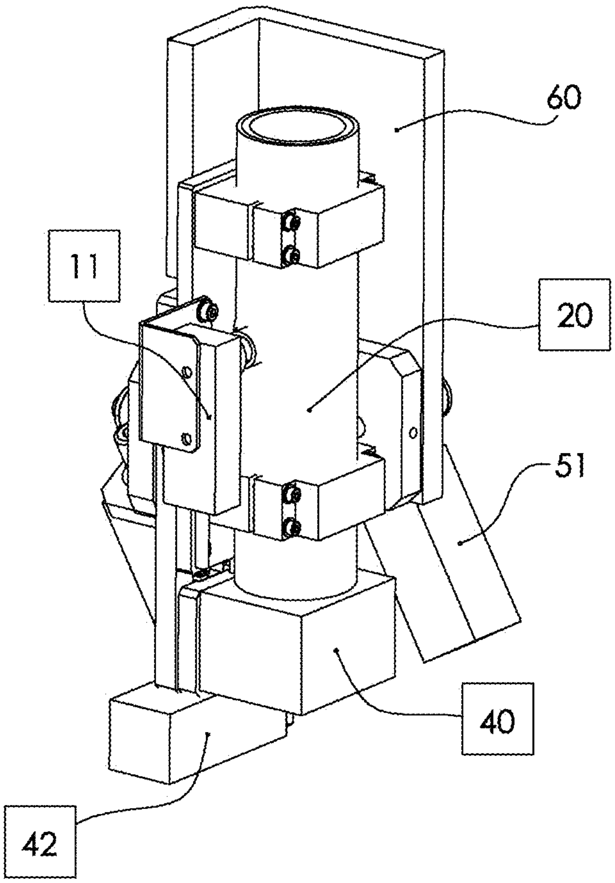
FIG. 15B is a perspective view as viewed from the back.

FIG. 15A is a perspective view illustrating the swing mechanism 50 of the observation device 10, and FIG. 15B is a perspective view as viewed from the back. The swing mechanism 50 includes a θx motor 51 and a worm gear 52 configured to rotationally drive a θx frame that is angularly displaceable about the X axis with respect to the holder 60, a θy motor 53 and a worm gear 54 configured to rotationally drive a θy frame that is angularly displaceable about the Y axis with respect to the holder 60, and the like. As the ex motor 51 and the θy motor 53, a motor controllable a rotation angle, for example, a pulse motor can be used.

By adopting such a swing mechanism 50, the observation direction of the phase contrast microscope 20 held by the holder 60 can be adjusted. In particular, in the present embodiment, since the reflection mirror 26 is slightly inclined, it is easy to adapt the observation direction to the traveling direction of the light reflected by the reflection mirror 26.

Moreover, the focusing mechanism 42 is provided below the phase contrast microscope 20. The focusing mechanism 42 includes a motor configured to rotationally drive a cam mechanism 41, and to adjust a position of the imaging camera 40 mounted on the cam mechanism 41 along the light traveling direction (Z direction). With such a mechanism, a clear image can be quickly acquired.

INDUSTRIAL APPLICABILITY

The present invention is industrially extremely useful in that stray light superimposed as noise on a sample image to be observed can be reduced to obtain a clear sample image.

EXPLANATION OF REFERENCES

1 incubator
2 hatch
11 light source
20 phase contrast microscope
21 half mirror
22, 23 objective lens
25 sample stage
26 reflection mirror
30 phase plate unit
31 phase plate region
32 transparent plate region
33 light shielding plate region
40 imaging camera
42 focusing mechanism
50 swing mechanism
63 Y movement mechanism
67 X movement mechanism
C multistage container
C1 to C5 container

The invention claimed is:

1. An observation device configured to observe a sample stored in a multistage container including a plurality of spaces divided by a plurality of partition walls which are parallel, the observation device comprising:

a light source configured to generate light;

a phase contrast microscope configured to irradiate the sample with light from the light source and to make executable observing a phase difference due to interference of light returned from the sample;

a reflection mirror configured to reflect light passed through the sample again toward the sample; and a swing mechanism configured to angularly displace the phase contrast microscope around a first axis and a second axis, the first axis and the second axis being perpendicular to a light traveling direction and orthogonal to each other, wherein the reflection mirror is inclined with respect to an outermost partition wall of the multistage container, and the phase contrast microscope includes a phase plate unit including a phase plate region that changes a phase of light, a transparent plate region that does not change a phase of light, and a light shielding plate region that blocks light.

2. The observation device according to claim 1, further comprising a two-dimensional movement mechanism configured to move the phase contrast microscope along a direction parallel to the first axis and a direction parallel to the second axis.

3. The observation device according to claim 2, further comprising a sample stage configured to support the multistage container storing the sample, wherein the two-dimensional movement mechanism is installed below the sample stage, and the phase contrast microscope is suspended downward from the two-dimensional movement mechanism.

4. The observation device according to claim 3, further comprising:

an imaging camera configured to acquire a sample image based on observing the phase difference using the phase contrast microscope;

an image processing circuit configured to repeat swing scanning and imaging of the phase contrast microscope for each predetermined step angle around the first axis and the second axis, and configured to store a plurality of sample images which are obtained; and a display unit configured to display the plurality of sample images stored in the image processing circuit on an identical screen.

5. The observation device according to claim 4, further comprising a focusing mechanism configured to adjust a position of the imaging camera along a light traveling direction.

6. The observation device according to claim 2, further comprising:

an imaging camera configured to acquire a sample image based on observing the phase difference using the phase contrast microscope;

an image processing circuit configured to repeat swing scanning and imaging of the phase contrast microscope for each predetermined step angle around the first axis and the second axis, and configured to store a plurality of sample images which are obtained; and a display unit configured to display the plurality of sample images stored in the image processing circuit on an identical screen.

7. The observation device according to claim 6, further comprising a focusing mechanism configured to adjust a position of the imaging camera along a light traveling direction.

8. The observation device according to claim 1, further comprising:

an imaging camera configured to acquire a sample image based on observing the phase difference using the phase contrast microscope;

an image processing circuit configured to repeat swing scanning and imaging of the phase contrast microscope for each predetermined step angle around the first axis and the second axis, and configured to store a plurality of sample images which are obtained; and a display unit configured to display the plurality of sample images stored in the image processing circuit on an identical screen.

9. The observation device according to claim 8, further comprising a focusing mechanism configured to adjust a position of the imaging camera along a light traveling direction.

10. The observation device according to claim 1, wherein the multistage container is installed inside an incubator.

* * * * *